(12) United States Patent
Haseba et al.

(10) Patent No.: US 11,959,006 B2
(45) Date of Patent: Apr. 16, 2024

(54) LIQUID CRYSTAL DISPLAY DEVICE

(71) Applicant: Sharp Kabushiki Kaisha, Sakai (JP)

(72) Inventors: Yasuhiro Haseba, Sakai (JP); Tomonori Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 44 days.

(21) Appl. No.: 17/828,499

(22) Filed: May 31, 2022

(65) Prior Publication Data

US 2022/0404673 A1 Dec. 22, 2022

(30) Foreign Application Priority Data

Jun. 2, 2021 (JP) .................. 2021-093073

(51) Int. Cl.
| | |
|---|---|
| *C09K 19/04* | (2006.01) |
| *C09K 19/16* | (2006.01) |
| *C09K 19/30* | (2006.01) |
| *G02F 1/1335* | (2006.01) |

(52) U.S. Cl.
CPC .............. *C09K 19/04* (2013.01); *C09K 19/16* (2013.01); *C09K 19/3003* (2013.01); *C09K 19/3048* (2013.01); *G02F 1/133514* (2013.01); *G02F 1/133614* (2021.01); *C09K 2019/161* (2013.01); *C09K 2019/3004* (2013.01); *C09K 2019/305* (2013.01)

(58) Field of Classification Search
CPC ..................................................... C09K 19/12
See application file for complete search history.

(56) References Cited

U.S. PATENT DOCUMENTS

| | | | |
|---|---|---|---|
| 6,444,278 B1 | 9/2002 | Reiffenrath et al. | |
| 2019/0144689 A1* | 5/2019 | Yamada .............. | C09D 133/08 349/71 |
| 2020/0199452 A1* | 6/2020 | Nakata .............. | C09K 19/3857 |
| 2022/0187660 A1* | 6/2022 | Nagatani ............. | H01L 25/0753 |

FOREIGN PATENT DOCUMENTS

| | | | | |
|---|---|---|---|---|
| JP | 09-124529 A | | 5/1997 | |
| KR | 2017073231 A | * | 6/2017 | ............. C09K 19/12 |

OTHER PUBLICATIONS

Machine Translation of KR 10-2017-0073231 (Year: 2023).*

* cited by examiner

*Primary Examiner* — Chanceity N Robinson
(74) *Attorney, Agent, or Firm* — Keating & Bennett, LLP (57) ABSTRACT

A liquid crystal display device includes a liquid crystal panel that includes a liquid crystal layer containing a liquid crystal composition; and a light source that emits light on the liquid crystal panel, the liquid crystal composition containing at least one of a first liquid crystal compound containing a phenyl group and a conjugated bond group that forms a conjugated system continuous with the phenyl group and a second liquid crystal compound containing an alkenyl group not forming a conjugated system, the light source emitting green light having a half width of less than 50 nm.

9 Claims, 5 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2021-093073 filed on Jun. 2, 2021, the contents of which are incorporated herein by reference in their entirety.

BACKGROUND OF THE INVENTION

Field of the Invention

The present invention relates to liquid crystal display devices.

Description of Related Art

Liquid crystal display devices are display devices utilizing a liquid crystal composition to display images. In a typical display mode thereof, voltage is applied to a liquid crystal composition sealed between a thin-film transistor (TFT) substrate and a counter substrate such that the alignment of liquid crystal compounds in the liquid crystal composition is changed according to the applied voltage, whereby the amount of light transmitted is controlled. Such liquid crystal display devices have advantageous features such as thin profile, light weight, and low power consumption, and are therefore used in a variety of fields.

As for a technology related to liquid crystal display devices, JP H9-124529 A discloses a 2,6-di-tert-butylphenol compound suitable for a stabilizer for liquid crystal compounds, for example.

BRIEF SUMMARY OF THE INVENTION

The studies made by the present inventors revealed that in order to increase the response speed of a liquid crystal display device, a liquid crystal compound containing a phenyl group and a conjugated bond group that forms a continuous conjugated system with the phenyl group (hereinafter, also referred to as a first liquid crystal compound) is slightly added to the liquid crystal composition, whereby the viscosity of the liquid crystal composition can be reduced. However, the liquid crystal composition containing at least one first liquid crystal compound is likely to undergo a decrease in the voltage holding ratio (VHR) through light irradiation.

The studies made by the present inventors also revealed that in order to reduce the viscosity of the liquid crystal composition, a liquid crystal compound containing an alkenyl group not forming a conjugated system (hereinafter, also referred to as a second liquid crystal compound) may be added to the liquid crystal composition. However, the liquid crystal composition containing the second liquid crystal compound is also likely to undergo a decrease in the VHR through light irradiation.

For these reasons, the first liquid crystal compound and the second liquid crystal compound cannot be used or can be used only with limited concentrations, failing to sufficiently increase the response speed of the liquid crystal display device.

The present invention has been made in view of such a current state of the art and aims to provide a liquid crystal display device that can achieve prevention of a decrease in the VHR and can achieve an increase in the response speed.

(1) One embodiment of the present invention is directed to a liquid crystal display device including: a liquid crystal panel that includes a liquid crystal layer containing a liquid crystal composition; and a light source that emits light on the liquid crystal panel, the liquid crystal composition containing at least one of a first liquid crystal compound containing a phenyl group and a conjugated bond group that forms a continuous conjugated system with the phenyl group and a second liquid crystal compound containing an alkenyl group not forming a conjugated system, the light source emitting green light having a half width of less than 50 nm.

(2) In an embodiment of the present invention, the liquid crystal display device includes the structure (1), and the light source emits green light having a half width of 40 nm or less.

(3) In an embodiment of the present invention, the liquid crystal display device includes the structure (2), and the light source emits green light having a half width of 25 nm or less.

(4) In an embodiment of the present invention, the liquid crystal display device includes the structure (1), (2), or (3), and the light source includes a blue light source that emits blue light and green quantum dots that emit green light.

(5) In an embodiment of the present invention, the liquid crystal display device includes the structure (1), (2), (3), or (4), and the liquid crystal composition contains the first liquid crystal compound in an amount of 2% by weight or more.

(6) In an embodiment of the present invention, the liquid crystal display device includes the structure (5), and the liquid crystal composition contains the first liquid crystal compound in an amount of 20% by weight or more.

(7) In an embodiment of the present invention, the liquid crystal display device includes the structure (1), (2), (3), (4), (5), or (6), and the liquid crystal composition contains the second liquid crystal compound in an amount of 51% by weight or more.

(8) In an embodiment of the present invention, the liquid crystal display device includes the structure (7), and the liquid crystal composition contains the second liquid crystal compound in an amount of 70% by weight or more.

(9) In an embodiment of the present invention, the liquid crystal display device includes the structure (1), (2), (3), (4), (5), (6), (7), or (8), and the first liquid crystal compound contains at least one of partial structures represented by the following formulas (L1) to (L5):

(L4)

(L5)

in (L1) to (L5), $X^{11}$ to $X^{16}$, $X^{21}$ to $X^{24}$, $X^{31}$ to $X^{34}$, $X^{41}$ to $X^{44}$, and $X^{51}$ to $X^{53}$ each independently represent a hydrogen group or a halogen group; and * represents a binding site.

(10) In an embodiment of the present invention, the liquid crystal display device includes the structure (1), (2), (3), (4), (5), (6), (7), (8), or (9), and the second liquid crystal compound contains at least one of partial structures represented by the following formulas (L6) and (L7):

(L6)

(L7)

in the formulas (L6) and (L7), $R^1$ represents a C1-C3 alkyl group; and * represents a binding site.

(11) In an embodiment of the present invention, the liquid crystal display device includes the structure (1), (2), (3), (4), (5), (6), (7), (8), (9), or (10), and the liquid crystal panel includes a blue color filter, the blue color filter having a maximum transmittance of 75% or higher in the wavelength band of 400 nm or more and less than 500 nm.

(12) In an embodiment of the present invention, the liquid crystal display device includes the structure (1), (2), (3), (4), (5), (6), (7), (8), (9), or (10), and the liquid crystal panel includes a green color filter, the green color filter having a transmittance of 5% or higher at a wavelength of 450 nm.

The present invention can provide a liquid crystal display device that can achieve prevention of a decrease in the VHR and can achieve an increase in the response speed.

DETAILED DESCRIPTION OF THE INVENTION

Hereinafter, the present invention is described in more detail based on embodiments with reference to the drawings. The embodiments, however, are not intended to limit the scope of the present invention.

Definition of Terms

Herein, the term "viewing surface side" means the side closer to the screen (display surface) of the liquid crystal display device, and the term "back surface side" means a side farther from the screen (display surface) of the liquid crystal display device.

Embodiment 1

Figure 1:
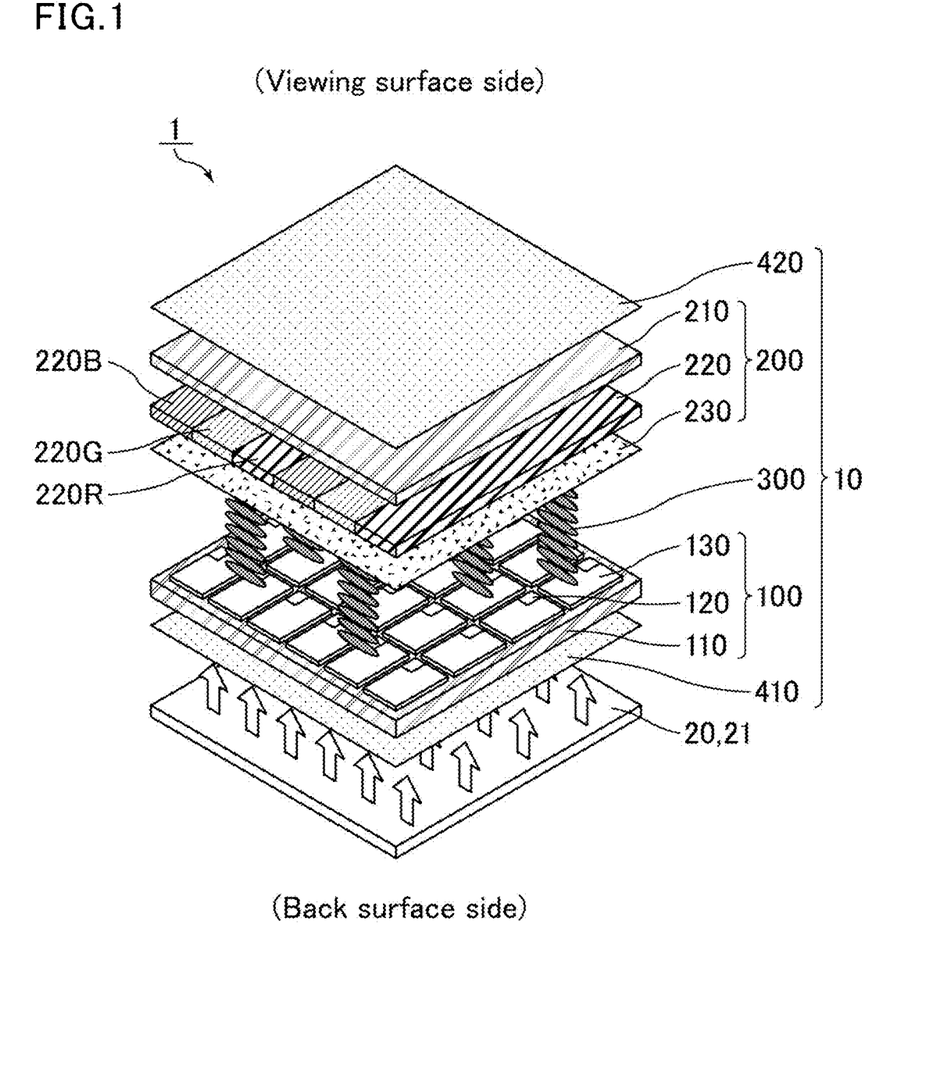
FIG. 1 is an exploded perspective view of a liquid crystal display device of Embodiment 1.

FIG. 1 is an exploded perspective view of a liquid crystal display device of Embodiment 1. As shown in FIG. 1, a liquid crystal display device 1 of the present embodiment includes a liquid crystal panel 10 and a backlight 20 disposed on the back surface side of the liquid crystal panel 10. The liquid crystal panel 10 includes a first polarizing plate 410, a first substrate 100, a first alignment film, a liquid crystal layer 300, a second alignment film, a second substrate 200, and a second polarizing plate 420 in the stated order from the back surface side to the viewing surface side. The backlight 20 includes a light source 21.

The first substrate 100 includes a supporting substrate 110, thin-film transistors (TFTs) 120 as switching elements, and pixel electrodes 130. The second substrate 200 includes a supporting substrate 210, a color filter layer 220 on a liquid crystal layer 300 side of the supporting substrate 210, and a common electrode 230 on a liquid crystal layer 300 side of the color filter layer 220. The color filter layer 220 includes red color filters 220R, green color filters 220G, and blue color filters 220B.

The liquid crystal layer 300 contains at least one of a first liquid crystal compound containing a phenyl group and a conjugated bond group that forms a continuous conjugated system with the phenyl group or a second liquid crystal compound containing an alkenyl group not forming a conjugated system. This feature can reduce the viscosity of the liquid crystal layer 300 and can increase the response speed of the liquid crystal display device 1.

Figure 2:
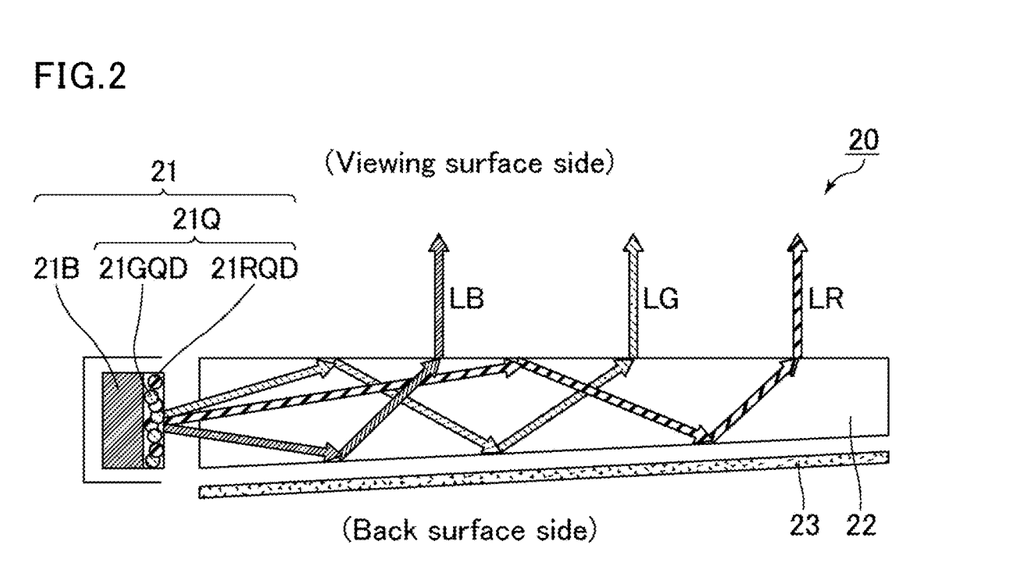
FIG. 2 is a schematic cross-sectional view of a backlight in the liquid crystal display device of Embodiment 1.

FIG. 2 is a schematic cross-sectional view of a backlight in the liquid crystal display device of Embodiment 1. As shown in FIG. 2, the backlight 20 includes the light source 21, a light guide plate 22, and a reflector 23.

The light source 21 emits green light LG having a half width of less than 50 nm. Here, when the liquid crystal layer contains at least one of the first liquid crystal compound or the second liquid crystal compound, the liquid crystal compound(s) undergoes radicalization and ionization caused by light having a wavelength equal to or shorter than the wavelength of blue light, leading to a decrease in the VHR of the liquid crystal display device. In the present embodiment, the light source 21 emits green light LG having a half width of less than 50 nm, and thus, the color gamut can be maintained, for example, by controlling the transmittance of the color filter layer 220 even when the intensity of the blue light LB is reduced. Thereby, the intensity of the blue light LB emitted from the light source 21 can be reduced. As a result, radicalization and ionization of the liquid crystal compound(s) contained in the liquid crystal layer 300 can be prevented, and a decrease in the VHR of the liquid crystal display device 1 can be prevented. The term "half width" means a full width at half maximum (FWHM).

As described above, in the present embodiment, the intensity of the blue light LB itself, which causes a decrease in the VHR, can be reduced while the color gamut is maintained, whereby a decrease in the VHR can be prevented. As a result, compounds having a problem with light resistance such as the first liquid crystal compound and the second liquid crystal compound can be used, or these liquid crystal compounds can be used at high concentrations in the liquid crystal composition, whereby the response speed of the liquid crystal display device 1 can be improved.

When the liquid crystal layer 300 contains at least one of the first liquid crystal compound or the second liquid crystal compound, the clearing point of the liquid crystal layer 300 is lowered by light having a wavelength equal to or shorter than the wavelength of the blue light LB. In the present embodiment, the light source 21 emits green light LG having a half width of less than 50 nm, and thus, the color gamut can be maintained, for example, by controlling the transmittance of the color filter layer 220 even when the intensity of the blue light LB is reduced. Thereby, the intensity of the blue light LB emitted from the light source 21 can be reduced. As a result, radicalization and ionization of the liquid crystal compound(s) contained in the liquid crystal layer 300 can be prevented, and a decrease in the clearing point of the liquid crystal layer 300 can be prevented. Here, the clearing point is a temperature at which the liquid crystal phase turns into an isotropic liquid.

When the stabilizer disclosed in Patent Literature 1 is used, an issue of reliability to light arises for some concentrations of an alkenyl compound and some applications of the display. For example, the VHR may decrease. Patent Literature 1 aims to increase the light resistance of a raw material, but does not examine prevention of a decrease in the VHR of the liquid crystal display device.

The following describes the components of the liquid crystal display device of the present embodiment.

As shown in FIG. 1, the first substrate 100 includes, on the supporting substrate 110, gate lines parallel to each other and source lines parallel to each other and intersecting the gate lines with a gate insulator in between. The gate lines and the source lines are formed in a grid pattern to define pixels. A TFT 120 is disposed at each intersection of a gate line and a source line.

Each TFT 120 is connected to a corresponding gate line and a corresponding source line among the gate lines and the source lines, and is a three-terminal switch including a gate electrode protruding from the corresponding gate line (being part of the gate line), a source electrode protruding from a corresponding source line (being part of the source line), a drain electrode connected to a corresponding pixel electrode 130 of the pixel electrodes 130, and a thin-film semiconductor layer. The source electrode and the drain electrode are disposed in a source line layer as with the source lines. The gate electrode is disposed in a gate line layer as with the gate lines.

The thin-film semiconductor layer of each TFT 120 is composed of, for example, a high resistive semiconductor layer made of a material such as amorphous silicon or polysilicon, and a low resistive semiconductor layer made of a material such as n+ amorphous silicon, which is amorphous silicon doped with an impurity such as phosphorus. The thin-film semiconductor layer may be an oxide semiconductor layer made of zinc oxide, for example.

The supporting substrates 110 and 210 are each preferably a transparent substrate such as a glass substrate or a plastic substrate.

The gate insulator is, for example, an inorganic insulating film. The inorganic insulating film may be, for example, an inorganic film (relative permittivity $\varepsilon=5$ to 7) made of silicon nitride ($SiN_x$) or silicon oxide ($SiO_2$), or a multilayer film including such films.

The gate line layer and the source line layer are each a single layer or multiple layers of, for example, a metal such as copper, titanium, aluminum, molybdenum, or tungsten or an alloy thereof. The conductive lines such as the gate lines and the source lines and the electrodes defining the TFTs 120 can each be formed by forming a single layer or multiple layers of a metal such as copper, titanium, aluminum, molybdenum, or tungsten or an alloy thereof and patterning the layer(s) by a technique such as photolithography. These conductive lines and electrodes can be efficiently produced by using the same material for the conductive lines and the electrodes to be formed in the same layer.

Each pixel electrode 130 is disposed in a corresponding region (pixel region) surrounded by two adjacent gate lines and two adjacent source lines. The pixel electrode 130 overlaps the corresponding pixel region. The pixel electrode 130 is electrically connected to the corresponding source line via the thin-film semiconductor layer of the corresponding TFT 120. The pixel electrode 130 is set at an electric potential corresponding to a data signal supplied via the corresponding TFT 120.

The pixel electrode 130 may be formed from, for example, indium tin oxide (ITO) or indium zinc oxide (IZO).

The color filter layer 220 includes the red color filters 220R, the green color filters 220G, and the blue color filters 220B arranged in a plane. The red color filters 220R, the green color filters 220G, and the blue color filters 220B are each, for example, formed from a transparent resin containing a pigment. Typically, a red color filter 220R, a green color filter 220G, and a blue color filter 220B in combination are arranged in each and every pixel, and a desired color can be produced for each pixel by mixing colored light beams passing through the red color filter 220R, the green color filter 220G, and the blue color filter 220B while controlling the amounts of the colored light beams.

For example, when the half width of the green light emitted by the light source 21 is wide relative to the CIE 1931 color space and the blue color filters have high transmittance, the green light component passing through the blue color filters increases. Thus, the color gamut cannot be maintained. In contrast, in the present embodiment in which the light source 21 emits green light LG having a reduced half width of less than 50 nm, the intensity of the green light component passing through the blue color filters 220B does not increase even when the blue color filters 220B have high transmittance. Thus, the color gamut can be maintained. As described above, in the present embodiment in which the light source 21 emits green light LG having a reduced half width of less than 50 nm, the color gamut can be maintained even when the blue color filters 220B have high transmittance. Thus, the intensity of the blue light LB emitted from the light source 21 can be reduced. As a result, radicalization and ionization of at least one of the first liquid crystal compound or the second liquid crystal compound in the liquid crystal layer 300 can be prevented, and a decrease in the VHR of the liquid crystal display device 1 can be prevented.

The blue color filters 220B preferably have a maximum transmittance of 75% or higher, more preferably 80% or higher, still more preferably 85% or higher in the wavelength band of 400 nm or more and less than 500 nm. This feature can further reduce the intensity of the blue light LB emitted from the light source 21 and can further prevent a decrease in the VHR of the liquid crystal display device 1.

The maximum transmittance of the blue color filters 220B is, for example, 100% or lower in the wavelength band of 400 nm or more and less than 500 nm.

The common electrode 230 is formed on almost the entire surface, except for specific portions, regardless of the boundaries of the pixels. To the common electrode 230 are supplied common signals of a constant value, such that the common electrode 230 is maintained at a constant electric potential.

The common electrode 230 may be formed from, for example, indium tin oxide (ITO) or indium zinc oxide (IZO).

The liquid crystal layer 300 contains a liquid crystal composition, and voltage is applied to the liquid crystal layer 300 such that the alignment of liquid crystal compounds in the liquid crystal composition is changed according to the applied voltage, whereby the amount of light transmitted is controlled. The liquid crystal layer 300 contains a liquid crystal compound which is vertically aligned to the first substrate 100 and the second substrate 200 with no voltage applied.

The anisotropy of dielectric constant (As) of the liquid crystal compound defined by the following formula (L) may be positive or negative. A liquid crystal compound having a positive anisotropy of dielectric constant is also referred to as positive liquid crystals, while a liquid crystal compound having a negative anisotropy of dielectric constant is also referred to as negative liquid crystals. The major axis direction of the liquid crystal compound is the slow axis direction. Liquid crystal compounds are homogeneously aligned in a state where no voltage is applied (with no voltage applied). The major axis direction of the liquid crystal compound with no voltage applied is also referred to as the direction of initial alignment of the liquid crystal compound.

Δε=(dielectric constant of liquid crystal molecules in major axis direction)−(dielectric constant of liquid crystal molecules in minor axis direction)  (L)

The liquid crystal composition contains at least one of the first liquid crystal compound or the second liquid crystal compound. The liquid crystal compounds are compounds that exhibit a liquid crystal phase such as a nematic phase or a smectic phase at low temperature (e.g., 70° C.). The liquid crystal compounds have a rigid site (mesogenic group) that exhibits liquid crystallinity.

The first liquid crystal compound is useful from the viewpoints of increasing the anisotropy of refractive index (Δn), increasing the anisotropy of dielectric constant, increasing the temperature range of the nematic phase, and reducing the viscosity, in the liquid crystal composition, but has particularly poor stability against blue light. Such a first liquid crystal compound is not used for a TFT liquid crystal display device requiring high VHR, or use thereof is very limited. The present inventors have found that use of the light source 21 that emits green light LG having a half width of less than 50 nm can reduce blue light LB without reducing the color gamut, particularly in the CIE 1931 color space (CIE 1931 (L*a*b*) color system) and in the CIE 1976 color space (CIE 1976 (L*a*b*) color system). The present inventors have also found that such a blue light reduction effect improves the VHR of the liquid crystal composition containing the first liquid crystal compound. The embodiments described herein are applicable to any color space. The present embodiment is particularly preferably applicable to the CIE 1931 color space, and Embodiment 2 described below is particularly preferably applicable to the CIE 1976 color space. Since the CIE 1976 color space has feature of transmitting a certain amount of blue light LB, which is not usually used in the color filters, the blue light reduction effect can be more effectively obtained.

The second liquid crystal compound has an effect of reducing the viscosity of the liquid crystal composition, and is thus widely used in liquid crystal display devices. However, too large an amount of the second liquid crystal compound is difficult to use in a TFT liquid crystal display device because blue light greatly reduces the VHR of the liquid crystal composition. Thus, use of the light source 21 that emits green light LG having a half width of less than 50 nm is effective to allow the composition to contain a larger amount of the second liquid crystal compound.

The first liquid crystal compound is, for example, a liquid crystal compound containing a phenyl group and a continuous conjugated double bond group or continuous conjugated triple bond group with the phenyl group. The first liquid crystal compound allows the liquid crystal layer to have a high anisotropy of refractive index.

Specifically, the first liquid crystal compound may contain at least one of partial structures represented by the following formulas (L1) to (L5). The first liquid crystal compound may include a compound containing two or more of the partial structures represented by the following formulas (L1) to (L5), or may include two or more compounds each containing at least one of the partial structures represented by the following formulas (L1) to (L5):

(L1)

(L2)

(L3)

in (L1) to (L5), $X^{11}$ to $X^{16}$, $X^{21}$ to $X^{24}$, $X^{31}$ to $X^{34}$, $X^{41}$ to $X^{44}$, and $X^{51}$ to $X^{53}$ each independently represent a hydrogen group or a halogen group, and * represents a binding site.

The first liquid crystal compound containing a partial structure represented by the formula (L1) is specifically, for example, a liquid crystal compound having a structure represented by the following formula (L1-1):

in the formula (L1-1), $R^{11}$ and $R^{12}$ each independently represent a hydrogen group, a hydroxy group, or a monovalent organic group.

The monovalent organic group in the formula (L1-1) is preferably a C1-C12 monovalent organic group, more preferably a C1-C12 alkyl group. The monovalent organic group contains a carbon atom, a hydrogen atom, and optionally a different atom (e.g., an oxygen atom or a halogen atom). In the alkyl group, one —CH$_2$—CH$_2$— may be replaced by —CH=CH—, and at least one hydrogen atom may be replaced by a halogen atom. The alkyl group may be linear, branched, or cyclic or may have a combination of two or more of linear, branched, and cyclic structures.

The first liquid crystal compound containing a partial structure represented by the formula (L2) is specifically, for example, a liquid crystal compound having any one of structures represented by the following formulas (L2-1) to (L2-3):

in the formulas (L2-1) to (L2-3), $R^{21}$ to $R^{25}$ each independently represent a hydrogen group, a hydroxy group, or a monovalent organic group.

The monovalent organic group in each of the formulas (L2-1) to (L2-3) is preferably a C1-C12 monovalent organic group, more preferably a C1-C12 alkyl group. The monovalent organic group contains a carbon atom, a hydrogen atom, and optionally a different atom (e.g., an oxygen atom or a halogen atom). In the alkyl group, one —CH$_2$—CH$_2$— may be replaced by —CH=CH—, and at least one hydrogen atom may be replaced by a halogen atom. The alkyl group may be linear, branched, or cyclic or may have a combination of two or more of linear, branched, and cyclic structures.

The first liquid crystal compound containing a partial structure represented by the formula (L3) is specifically, for example, a liquid crystal compound having a structure represented by the following formula (L3-1):

in the formula (L3-1), $R^{31}$ represents a hydrogen group, a hydroxy group, or a monovalent organic group.

The monovalent organic group in the formula (L3-1) is preferably a C1-C12 monovalent organic group, more preferably a C1-C12 alkyl group. The monovalent organic group contains a carbon atom, a hydrogen atom, and optionally a different atom (e.g., an oxygen atom or a halogen atom). In the alkyl group, one —CH$_2$—CH$_2$— may be replaced by —CH=CH—, and at least one hydrogen atom may be replaced by a halogen atom. The alkyl group may be linear, branched, or cyclic or may have a combination of two or more of linear, branched, and cyclic structures.

The first liquid crystal compound containing a partial structure represented by the formula (L4) is specifically, for example, a liquid crystal compound having a structure represented by the following formula (L4-1):

in the formula (L4-1), $R^{41}$ represents a hydrogen group, a hydroxy group, or a monovalent organic group.

The monovalent organic group in the formula (L4-1) is preferably a C1-C12 monovalent organic group, more preferably a C1-C12 alkyl group, still more preferably a C3 alkyl group. The monovalent organic group contains a carbon atom, a hydrogen atom, and optionally a different atom (e.g., an oxygen atom or a halogen atom). In the alkyl group, one —CH$_2$—CH$_2$— may be replaced by —CH═CH—, and at least one hydrogen atom may be replaced by a halogen atom. The alkyl group may be linear, branched, or cyclic or may have a combination of two or more of linear, branched, and cyclic structures.

The first liquid crystal compound containing a partial structure represented by the formula (L5) is specifically, for example, a liquid crystal compound having a structure represented by the following formula (L5-1):

(L5-1)

in the formula (L5-1), R$^{51}$ and R$^{52}$ each independently represent a hydrogen group, a hydroxy group, or a monovalent organic group.

The monovalent organic group in the formula (L5-1) is preferably a C1-C12 monovalent organic group, more preferably a C1-C12 alkyl group, still more preferably a C3 alkyl group. The monovalent organic group contains a carbon atom, a hydrogen atom, and optionally a different atom (e.g., an oxygen atom or a halogen atom). In the alkyl group, one —CH$_2$—CH$_2$— may be replaced by —CH═CH—, and at least one hydrogen atom may be replaced by a halogen atom. The alkyl group may be linear, branched, or cyclic or may have a combination of two or more of linear, branched, and cyclic structures.

Specifically, the second liquid crystal compound may contain at least one of partial structures represented by the following formulas (L6) and (L7). The second liquid crystal compound may include a compound containing both of the partial structures represented by the following formulas (L6) and (L7), or may include two or more compounds each containing at least one of the partial structures represented by the following formulas (L6) and (L7):

(L6)

(L7)

in the formula (L7), R$^1$ represents a C1-C3 alkyl group, and * represents a binding site.

In the C1-C3 alkyl group in the formula (L7), at least one hydrogen atom may be replaced by a halogen atom. The C1-C3 alkyl group may be linear, branched, or cyclic.

The second liquid crystal compound containing a partial structure represented by the formula (L6) is specifically, for example, a liquid crystal compound having a structure represented by the following formula (L6-1):

(L6-1)

in the formula (L6-1), R$^{61}$ represents a hydrogen group, a hydroxy group, or a monovalent organic group.

The monovalent organic group in the formula (L6-1) is preferably a C1-C12 monovalent organic group, more preferably a C1-C12 alkyl group, still more preferably a C3 alkyl group. The monovalent organic group contains a carbon atom, a hydrogen atom, and optionally a different atom (e.g., an oxygen atom or a halogen atom). In the alkyl group, one —CH$_2$—CH$_2$— may be replaced by —CH═CH—, and at least one hydrogen atom may be replaced by a halogen atom. The alkyl group may be linear, branched, or cyclic or may have a combination of two or more of linear, branched, and cyclic structures.

The second liquid crystal compound containing a partial structure represented by the formula (L7) is specifically, for example, a liquid crystal compound having a structure represented by the following formula (L7-1):

(L7-1)

in the formula (L7-1), R$^{71}$ represents a hydrogen group, a hydroxy group, or a monovalent organic group; and R$^1$ represents a C1-C3 alkyl group.

The monovalent organic group in the formula (L7-1) is preferably a C1-C12 monovalent organic group, more preferably a C1-C12 alkyl group, still more preferably a C3 alkyl group. The monovalent organic group contains a carbon atom, a hydrogen atom, and optionally a different atom (e.g., an oxygen atom or a halogen atom). In the alkyl group, one —CH$_2$—CH$_2$— may be replaced by —CH═CH—, and at least one hydrogen atom may be replaced by a halogen atom. The alkyl group may be linear, branched, or cyclic or may have a combination of two or more of linear, branched, and cyclic structures.

R$^1$ in the formula (L7-1) is the same as R$^1$ in the formula (L7).

The liquid crystal composition contains at least one of the first liquid crystal compound or the second liquid crystal compound. The liquid crystal composition may contain either the first liquid crystal compound or the second liquid crystal compound or may contain both the first liquid crystal compound and the second liquid crystal compound. The liquid crystal composition may contain a liquid crystal compound other than the first liquid crystal compound and the second liquid crystal compound.

When the liquid crystal composition contains the first liquid crystal compound, the liquid crystal layer 300 may contain one or two more of the first liquid crystal compounds. Similarly, when the liquid crystal layer 300 contains the second liquid crystal compound, the liquid crystal layer 300 may contain one or two or more of the second liquid crystal compounds.

The amount of the first liquid crystal compound in the liquid crystal composition is preferably 2% by weight or more, more preferably 20% by weight or more, still more preferably 30% by weight or more. This feature can further increase the response speed of the liquid crystal display device. The amount of the first liquid crystal compound in the liquid crystal composition is preferably 70% by weight or less. This feature can effectively prevent a decrease in the VHR.

The amount of the second liquid crystal compound in the liquid crystal composition is preferably 51% by weight or more, more preferably 60% by weight or more, still more preferably 70% by weight or more. This feature can further increase the response speed of the liquid crystal display device. The amount of the second liquid crystal compound in the liquid crystal composition is preferably 90% by weight or less. This feature can effectively prevent a decrease in the VHR.

The liquid crystal composition preferably contains the first liquid crystal compound. This feature can effectively prevent a decrease in the VHR.

The liquid crystal layer 300 may contain a polymer network. This feature allows ions, which are considered to cause deterioration of the VHR, to be blocked by the polymer network and less likely to reach the electrodes. Thereby, the VHR can be enhanced.

The first alignment film and the second alignment film each have a function to control the alignment of the liquid crystal compound(s) contained in the liquid crystal layer 300. The first alignment film and the second alignment film are vertical alignment films that align, in the pixel region, the liquid crystal compound(s) in the liquid crystal layer 300 vertically to the main surface of the first substrate 100 and the main surface of the second substrate 200, when a voltage applied to the liquid crystal layer 300 is less than the threshold voltage (including the case where no voltage is applied). Here, the expression "align the liquid crystal compound(s) vertically to the main surfaces of the substrates" means that the pre-tilt angle of the liquid crystal compound(s) is 86° to 90°, preferably 87° to 89°, more preferably 87.5° to 89°, to the main surface of each substrate. The pre-tilt angle of the liquid crystal compound(s) means an inclination angle of the major axis of the liquid crystal compound(s) to the main surface of each substrate when no voltage is applied to the liquid crystal layer 300.

The first alignment film and the second alignment film are layers on which the alignment treatment to control the alignment of liquid crystal compounds has been performed. These alignment films may be common alignment films used in the field of liquid crystal display devices, such as a polyimide. The first alignment film and the second alignment film may be formed from, for example, a polymer whose main chain is derived from a polyimide, a polyamic acid, or a polysiloxane. Preferred is a photoalignment film material having a photoreactive site (functional group) in its main chain or side chain.

The first alignment film and the second alignment film each may be an aliphatic alignment film. In other words, the first alignment film and the second alignment film each may be an aliphatic group-containing alignment film. This feature can prevent energy movement from the alignment films and radicalization of the alignment films, which can prevent radicalization and ionization of the liquid crystal compound(s). Thereby, the VHR can be enhanced.

The first polarizing plate 410 and the second polarizing plate 420 are absorptive linearly polarizing plates. The first polarizing plate 410 and the second polarizing plate 420 each can be, for example, a polarizer (absorptive polarizing plate) obtained by dyeing a polyvinyl alcohol (PVA) film with an anisotropic material such as an iodine complex (or a dye) to adsorb the material on the PVA film and stretch-aligning the material. Typically, in order to achieve a mechanical strength and moist heat resistance, each surface of the PVA film is laminated with a protective film such as a triacetyl cellulose (TAC) film for practical use.

The first polarizing plate 410 and the second polarizing plate 420 are preferably disposed such that their absorption axes are perpendicular to each other. The first polarizing plate 410 and the second polarizing plate 420 in this structure are disposed in crossed Nicols, and thereby can achieve favorable black display with no voltage applied.

Herein, the state where two axes (directions) are "perpendicular to each other" means that they form an angle (absolute value) falling within the range of 90°±3°, preferably 90°±1°, more preferably 90°±0.5°, particularly preferably 90° (perfectly perpendicular to each other).

The liquid crystal display device 1 further includes a source driver electrically connected to the source lines, a gate driver electrically connected to the gate lines, and a controller. The gate driver sequentially supplies scanning signals to the gate lines based on the control by the controller. The source driver supplies data signals to the source lines based on the control by the controller when the corresponding TFTs 120 are in the voltage applied state according to the scanning signals. Each pixel electrode 130 is set at a potential according to the data signal supplied thereto via the corresponding TFT 120, so that a vertical electric field is generated between the pixel electrode 130 and the common electrode 230 and thereby the alignment of the liquid crystal compound in the liquid crystal layer 300 is controlled. The liquid crystal display device 1 displays images in such a way that the alignment of liquid crystal compounds is changed in each and every pixel according to voltage applied to the liquid crystal layer 300 to control the percentage of light passing through the liquid crystal layer 300.

The liquid crystal display device 1 of the present embodiment is a vertical alignment (VA) mode liquid crystal display device, which is of a vertical electric field mode. The features in the present embodiment are applicable to liquid crystal display devices of other modes. For example, the features are applicable to, for example, a twisted nematic (TN) mode liquid crystal display device, which is of a vertical electric field mode, and a fringe field switching (FFS) mode liquid crystal display device and an in-plane-switching (IPS) mode liquid crystal display device, each of which is of a horizontal electric field mode.

When the liquid crystal display device 1 is of a horizontal electric field mode, the liquid crystal layer 300 contains a liquid crystal compound which is aligned horizontally to the first substrate 100 and the second substrate 200 with no voltage applied.

In the liquid crystal display device 1 of a horizontal electric field mode, the first alignment film and the second alignment film are horizontal alignment films that align, in the pixel region, the liquid crystal compound(s) in the liquid crystal layer 300 horizontally to the main surface of the first substrate 100 and the main surface of the second substrate 200 when a voltage applied to the liquid crystal layer 300 is less than the threshold voltage (including the case where no voltage is applied). Here, the expression "align the liquid crystal compound(s) horizontally to the main surfaces of the substrates" means that the pre-tilt angle of the liquid crystal compound(s) is 0° to 5°, preferably 0° to 2°, more preferably 0° to 1°, to the main surfaces of the substrates.

The backlight 20 may be any backlight that emits light on the liquid crystal panel 10, and may be a direct-lit backlight, an edge-lit backlight, or a backlight of any other type. The backlight 20 of the present embodiment includes, as shown in FIG. 2, the light source 21, the light guide plate 22, and the reflector 23.

The light source 21 emits green light LG having a half width of less than 50 nm. Use of such a light source 21 that emits green light LG having a narrow half width can reduce the intensity of the blue light LB without deterioration of the color gamut, and thereby radicalization and/or ionization of the liquid crystal compound(s) (the first liquid crystal compound and/or the second liquid crystal compound) contained in the liquid crystal layer 300 can be prevented. As a result, a decrease in the VHR of the liquid crystal display device can be prevented.

This can increase the upper limit of the concentrations of the first liquid crystal compound and the second liquid crystal compound in the liquid crystal layer 300, whereby the response speed of the liquid crystal display device 1 can be improved and the anisotropy of refractive index of the liquid crystal composition can also be increased.

Further, use of the light source 21 that emits green light LG having a half width of less than 50 nm can prevent a decrease in the clearing point of the liquid crystal layer 300. For example, it is considered that the liquid crystal compound having a structure represented by the formula (L1-1) undergoes radicalization and ionization caused by blue light, which induces the isomerization of a trans-double bond to a cis-double bond, lowering the clearing point. In contrast, according to the present embodiment, use of the light source 21 that emits green light LG having a half width of less than 50 nm can reduce the intensity of the blue light LB, and thereby radicalization and/or ionization of the liquid crystal compound(s) in the liquid crystal layer 300 can be prevented. As a result, a decrease in the clearing point of the liquid crystal layer can be prevented.

The green light LG emitted by the light source 21 preferably has a half width of 40 nm or less, more preferably a half width of 25 nm or less. This feature can further prevent a decrease in the VHR of the liquid crystal display device 1.

The green light LG emitted by the light source 21 preferably has a half width of 5 nm or more. This feature allows stable production of quantum dots that emit green light LG when they are used.

The light source 21 may be one including a blue light source 21B that emits blue light LB, green quantum dots 21GQD that emit green light LG with the blue light LB as excitation light, and red quantum dots 21RQD that emit red light LR with the blue light LB as excitation light. Here, quantum dots are also referred to as QDs.

The light source 21 emits on the light guide plate 22 white light containing blue light LB emitted by the blue light source 21B, green light LG emitted when the blue light LB passes through the green quantum dots 21GQD, and red light LR emitted when the blue light LB passes through the red quantum dots 21RQD. Thereby, the white light travels from the light guide plate 22 toward the viewing surface side.

The blue light source 21B is disposed on a side surface of the light guide plate 22, and the green quantum dots 21GQD and the red quantum dots 21RQD are included in a quantum dot sheet (QD sheet) 21Q disposed on a light guide plate 22 side surface of the blue light source 21B. The backlight 20 of the present embodiment is an edge-lit backlight in which the light source (the blue light source 21B) that emits light is disposed on the side surface of the light guide plate 22.

The blue light source 21B has a function to emit blue light LB. The blue light LB has a peak wavelength of 400 nm or longer and shorter than 500 nm. Specifically, the blue light source 21B includes a blue light emitting diode (LED).

The peak wavelength of the blue light LB is preferably 453 nm or longer and shorter than 480 nm. This feature allows the blue light LB to have a longer wavelength, and thereby radicalization and ionization of the liquid crystal compound(s) caused by the blue light LB can be prevented. As a result, a decrease in the VHR of the liquid crystal display device 1 can be prevented. Thus, the concentrations of the first liquid crystal compound and the second liquid crystal compound in the liquid crystal composition may be high.

The green quantum dots 21GQD have a function to emit green light LG with the blue light LB emitted from the blue light source 21B as excitation light. The green light LG has a peak wavelength of 500 nm or longer and shorter than 600 nm. The green quantum dots 21GQD are included in the QD sheet 21Q provided on a blue LED chip that serves as the blue light source 21B.

The half width of the green light LG can be controlled, for example, by changing the size variation of the green quantum dots 21GQD.

The red quantum dots 21RQD have a function to emit red light LR with the blue light LB emitted from the blue light source 21B as excitation light. The red light LR has a peak wavelength of 600 nm or longer and shorter than 700 nm. The red quantum dots 21RQD are included in the QD sheet 21Q provided on a blue LED chip that serves as the blue light source 21B.

The light guide plate 22 has a function to achieve uniform plane emission of light incident from the side surface and may be one usually used in the field of liquid crystal display devices. The reflector 23 has a function to reflect light emitted from the light source 21 toward the liquid crystal layer 300 and may be one usually used in the field of liquid crystal display devices.

The backlight 20 may further include an optical sheet(s) such as a diffuser and/or a prism sheet as appropriate.

The liquid crystal display device 1 of the present embodiment includes, in addition to the liquid crystal panel 10 and the backlight 20, components including: external circuits such as a tape carrier package (TCP) and a printed circuit board (PCB); optical films such as a viewing angle widening film and a luminance improving film; and a bezel (frame), and some components may be incorporated into another component. Components other than the components described above are not limited, and those usually used in the field of liquid crystal display devices can be used. Thus, the description thereof is omitted.

Embodiment 2

In the present embodiment, features unique to the present embodiment are mainly explained and description of the same points as in Embodiment 1 is omitted. The above-described embodiment describes that the light source 21 emits green light LG having a half width of less than 50 nm, and thus, the intensity of blue light LB can be reduced even when the blue color filters 220B have high transmittance. In addition, the light source 21 emits green light LG having a half width of less than 50 nm, and thus, for example, the peak wavelength of the green light LG is shortened, and the intensity of the blue light LB can be reduced even when the green color filters 220G have high transmittance.

Specifically, the peak wavelength of the green light LG emitted from the light source 21 is shortened and the green color filters 220G have high transmittance. Thereby, the amount of the blue light component passing through the green color filters 220G in the green pixels increases to generate blue light leakage. When the white point of the liquid crystal display device in which the blue light leakage occurs is matched to that of the reference liquid crystal display device, the intensity of the blue light LB may be low, and the intensity of the blue light LB emitted from the light source 21 can be thus reduced. However, the increase in the transmittance of the green color filters 220G causes the blue light leakage and red light leakage in the green pixels and increases the half width of the green light after passing through the green color filters 220G, leading to deterioration of the color gamut. In the present embodiment, use of the light source 21 that emits green light LG having a half width of less than 50 nm can prevent deterioration of the color gamut. As described above, also in the present embodiment, the intensity of the blue light LB emitted from the light source 21 can be reduced while the color gamut is maintained, whereby a decrease in the VHR of the liquid crystal display device can be prevented. As a result, compounds having a problem with light resistance such as the first liquid crystal compound and the second liquid crystal compound can be used, or these liquid crystal compounds can be used at increased concentrations in the liquid crystal composition, whereby the response speed of the liquid crystal display device 1 can be improved.

The green color filters 220G preferably have a transmittance of 5% or higher, more preferably 20% or higher, still more preferably 30% or higher at a wavelength of 450 nm. This feature can more effectively generate blue light leakage. As a result, the intensity of the blue light LB emitted from the light source 21 can be effectively reduced, and a decrease in the VHR of the liquid crystal display device 1 can be effectively prevented.

The green color filters 220G preferably have a transmittance of 60% or lower, more preferably 55% or lower, still more preferably 50% or lower at a wavelength of 450 nm. This feature can prevent excessive deterioration of the color gamut.

The green color filters 220G preferably have a maximum transmittance of 70% or higher, more preferably 80% or higher, still more preferably 90% or higher in the wavelength band of 500 nm or more and less than 600 nm. This feature can provide a liquid crystal display device with high luminance.

The green color filters 220G have a maximum transmittance of, for example, 100% or lower in the wavelength band of 500 nm or more and less than 600 nm.

The green color filters 220G have a transmittance of, for example, 0% or higher at a wavelength of 650 nm.

The green color filters 220G preferably have a transmittance of 40% or lower, more preferably 30% or lower, still more preferably 5% or lower at a wavelength of 650 nm. This feature can easily maintain the color gamut.

Thus, in the present embodiment, the white luminance can be improved because the transmittance of the green color filters 220G is increased.

The green light LG preferably has a peak wavelength of 510 nm or longer and 550 nm or shorter, more preferably 520 nm or longer and 540 nm or shorter. This feature can more effectively generate blue light leakage. As a result, the intensity of the blue light LB emitted from the light source 21 can be effectively reduced, and a decrease in the VHR of the liquid crystal display device 1 can be effectively prevented.

The green area of the CIE 1976 color space is smaller than the green area of the CIE 1931 color space, and thus, the color gamut of the CIE 1976 color space is relatively insensitive to green chromaticity changes. Accordingly, in the CIE 1976 color space, the blue light leakage in the green pixels has a small impact on the color gamut. Thus, use of the light source 21 that emits green light LG having a narrow half width of less than 50 nm can maintain the color gamut even when the green color filters 220G have high transmittance.

Modified Example 1

Figure 3:
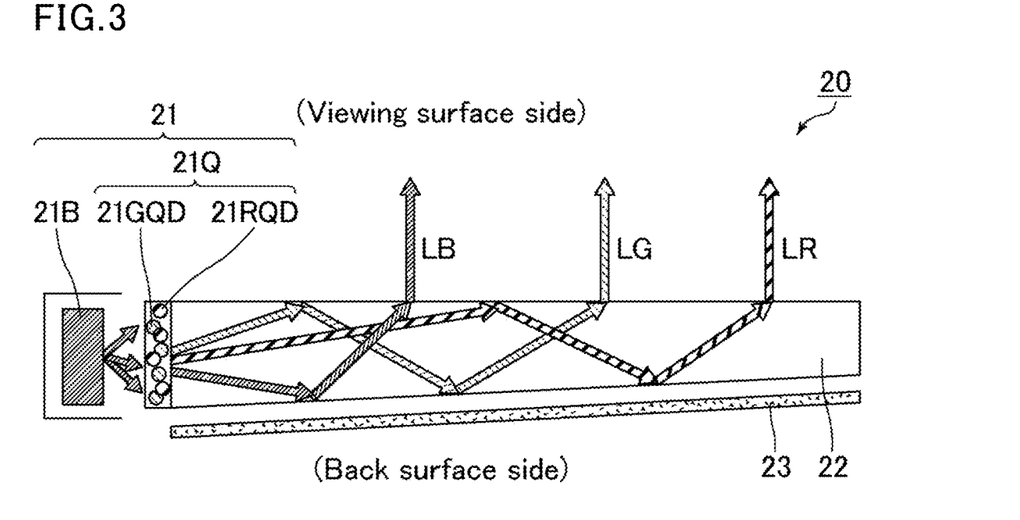
FIG. 3 is a schematic cross-sectional view of a backlight in a liquid crystal display device of Modified Example 1.

FIG. 3 is a schematic cross-sectional view of a backlight in a liquid crystal display device of Modified Example 1. The above-described embodiment describes a structure in which the QD sheet 21Q containing the red quantum dots 21RQD and the green quantum dots 21GQD is provided on a blue LED chip that serves as the blue light source 21B. Alternatively, the QD sheet 21Q may be provided in contact with an edge of the light guide plate 22 as shown in FIG. 3.

Modified Example 2

Figure 4:
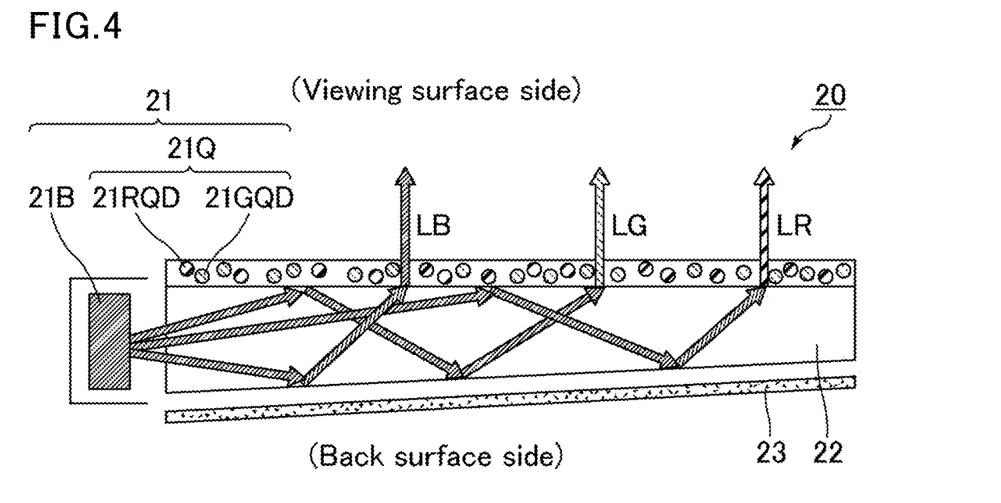
FIG. 4 is a schematic cross-sectional view of a backlight in a liquid crystal display device of Modified Example 2.

FIG. 4 is a schematic cross-sectional view of a backlight in a liquid crystal display device of Modified Example 2. The above-described embodiment describes a structure in which the QD sheet 21Q is provided on a blue LED chip that serves as the blue light source 21B. Alternatively, the QD sheet 21Q may be provided on a viewing surface side surface of the light guide plate 22 as shown in FIG. 4. In this case, the blue light LB travels from the light guide plate 22 toward the viewing surface side. Further, the red quantum dots 21RQD provided on the viewing surface side surface of the light guide plate 22 emit red light LR with the blue light LB traveling from the light guide plate 22 toward the viewing surface side as excitation light, and the red light LR travels toward the viewing surface side. The green quantum dots 21GQD provided on the viewing surface side surface of the light guide plate 22 emit green light LG with the blue light LB traveling from the light guide plate 22 toward the viewing surface side as excitation light, and the green light LG travels toward the viewing surface side. In this way, white light containing blue light LB, red light LR, and green light LG travels from the light guide plate 22 toward the viewing surface side.

Modified Example 3

The above-described embodiment describes a structure in which the color filter layer 220 is provided on the second substrate 200. Alternatively, the color filter layer 220 may be provided on the first substrate 100. This structure in which the color filter layer 220 is disposed between the light source 21 and the liquid crystal layer 300 also can prevent a decrease in the VHR of the liquid crystal display device 1 and can increase the response speed of the liquid crystal display device 1.

Modified Example 4

The above-described embodiment describes a structure in which the first substrate 100 is disposed on the back surface side and the second substrate 200 is disposed on the viewing surface side. Alternatively, the first substrate 100 may be disposed on the viewing surface side, and the second substrate 200 may be disposed on the back surface side. The structure in which the color filter layer 220 is disposed between the light source 21 and the liquid crystal layer 300 also can prevent a decrease in the VHR of the liquid crystal display device 1 and can increase the response speed of the liquid crystal display device 1.

Modified Example 5

The backlight 20 may be a directional backlight with directivity provided by controlling the direction of light emission. This feature can improve the luminance of the liquid crystal display device 1. The directional backlight can be achieved by optimizing, for example, the shape and arrangement of the reflection pattern in the light guide plate 22.

Modified Example 6

The liquid crystal display device 1 may further include an alignment control layer on a liquid crystal layer 300 side surface of each of the first alignment film and the second alignment film. The alignment control layer has a function to impart a pre-tilt angle to the liquid crystal compound with no voltage applied. In the polymer sustained alignment (PSA) technology that is to impart a pre-tilt angle to a liquid crystal composition through formation of alignment control layers, a liquid crystal cell is prepared in which a liquid crystal composition containing a liquid crystal compound, a polymerizable compound, and other components is placed between the first substrate 100 and the second substrate 200 each having an alignment layer formed thereon, light is applied to the liquid crystal cell with a predetermined voltage being applied, and the polymerizable compound in the liquid crystal composition is polymerized to form alignment control layers on the alignment layers. Thereby, a tilt angle can be imparted to the liquid crystal compound with no voltage applied.

The PSA technology is likely to cause a decrease in the VHR. This is presumably because the PSA technology includes light application for formation of alignment control layers, but some liquid crystal compounds have low resistance to ultraviolet light and cause deterioration such as cleavage due to light exposure. However, a decrease in the VHR can be prevented in the liquid crystal display device 1 in which the light source 21 emits green light LG having a half width of less than 50 nm, so that alignment control layers can be formed in the liquid crystal display device 1. The formation of the alignment control layers in the liquid crystal display device 1 can achieve an increase in the response speed of the liquid crystal display device 1.

The present invention is further described in detail below based on examples and comparative examples. The present invention is not limited to these examples.

Example 1

Figure 5:
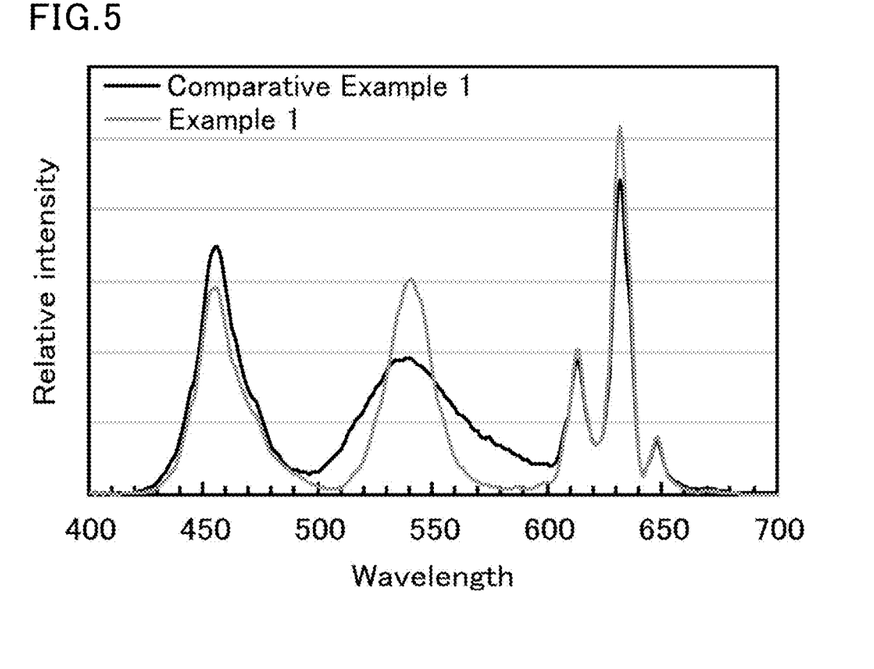
FIG. 5 is a graph showing the wavelength characteristics of light sources in liquid crystal display devices of Example 1 and Comparative Example 1.

FIG. 5 is a graph showing the wavelength characteristics of light sources in liquid crystal display devices of Example 1 and Comparative Example 1. The liquid crystal display device of Example 1 having the same configuration as the liquid crystal display device 1 of Embodiment 1 was produced.

The liquid crystal composition of Example 1 contained the second liquid crystal compound (negative liquid crystal, a liquid crystal compound in which $R^{61}$ is a normal propyl group in the formula (L6-1)) in an amount of 51% by weight. The blue color filters had a maximum transmittance of 92% in the wavelength band of 400 nm or more and less than 500 nm. The light source used was a QD sheet that emitted green light having a peak wavelength of 540 nm and a half width of 24 nm. The light source had the wavelength characteristics of Example 1 shown in FIG. 5.

The backlight luminance was set to 10,000 cd/m². The liquid crystal panel included polarizing plates and a liquid crystal cell with alignment films. A target color gamut of the liquid crystal display device of Example 1 was in the CIE 1931 color space.

Comparative Example 1

The liquid crystal display device of Comparative Example 1 was produced as in Example 1 except that a light source having the wavelength characteristics of Comparative Example 1 shown in FIG. 5 and blue color filters having a maximum transmittance of 73% in the wavelength band of 400 nm or more and less than 500 nm were used. The light source used in Comparative Example 1 was β-SiAlON phosphor that emitted green light having a peak wavelength of 540 nm and a half width of 54 nm.

Evaluation of Example 1 and Comparative Example 1

In the liquid crystal display device of Example 1, the green light had a narrower half width, and thus, the color gamut was maintained even though the blue color filters had high transmittance, and as shown in Table 1, the intensity of the blue light in the liquid crystal display device of Example 1 was reduced by 17% from that in the liquid crystal display device of Comparative Example 1. Thereby, a decrease in the VHR of the liquid crystal composition was prevented. Accordingly, the first liquid crystal compound and the second liquid crystal compound were able to be introduced in the liquid crystal composition, each of which had a VHR easily decreased when exposed to blue light but achieved high speed response and high Δn.

TABLE 1

| | Half-value width of green light | White point | NTSC area ratio (xy) (%) | Percentage of reduction in intensity of blue light (%) |
|---|---|---|---|---|
| Comparative Example 1 | 54 nm | D65 | 89.5 | — |
| Example 1 | 24 nm | D65 | 89.5 | 17% |

Figure 6:
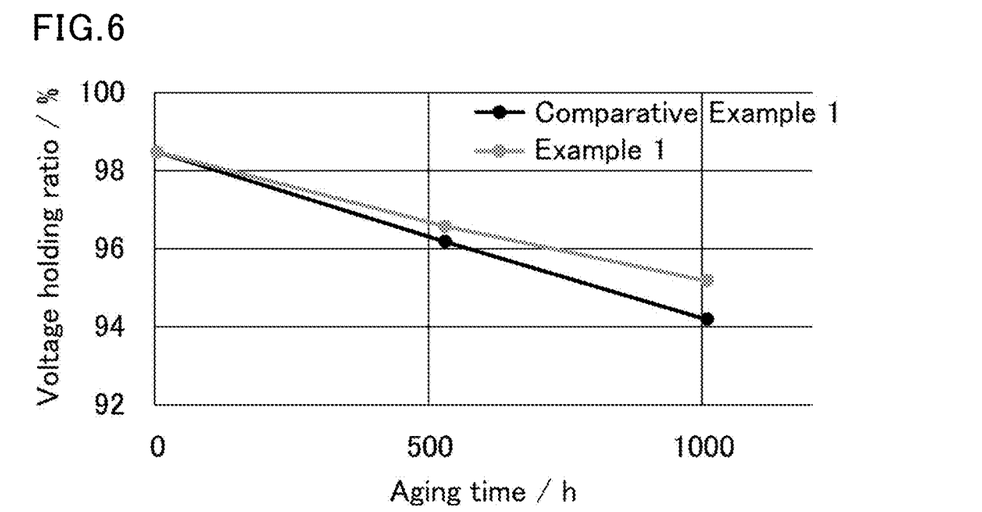
FIG. 6 is a graph showing the VHRs of the liquid crystal display devices of Example 1 and Comparative Example 1.

FIG. 6 is a graph showing the VHRs of the liquid crystal display devices of Example 1 and Comparative Example 1. The liquid crystal display devices of Example 1 and Comparative Example 1 were driven at room temperature, 1 V, and 30 Hz, and the VHR relative to the aging time was measured. The results are shown in FIG. 6.

As shown in FIG. 6, the VHR of the liquid crystal display device of Example 1 after 1000-hour aging was improved by 1.0% compared to that of the liquid crystal display device of Comparative Example 1. In Example 1, the VHR of the liquid crystal display device after 1000 hour-aging was improved by 1.0% compared to that of the liquid crystal display device of Comparative Example 1 by using a light source that emitted green light having a half width of 24 nm, even when the liquid crystal display devices of Example 1 and Comparative Example 1 had the same NTSC area ratio.

Example 2

Figure 7:
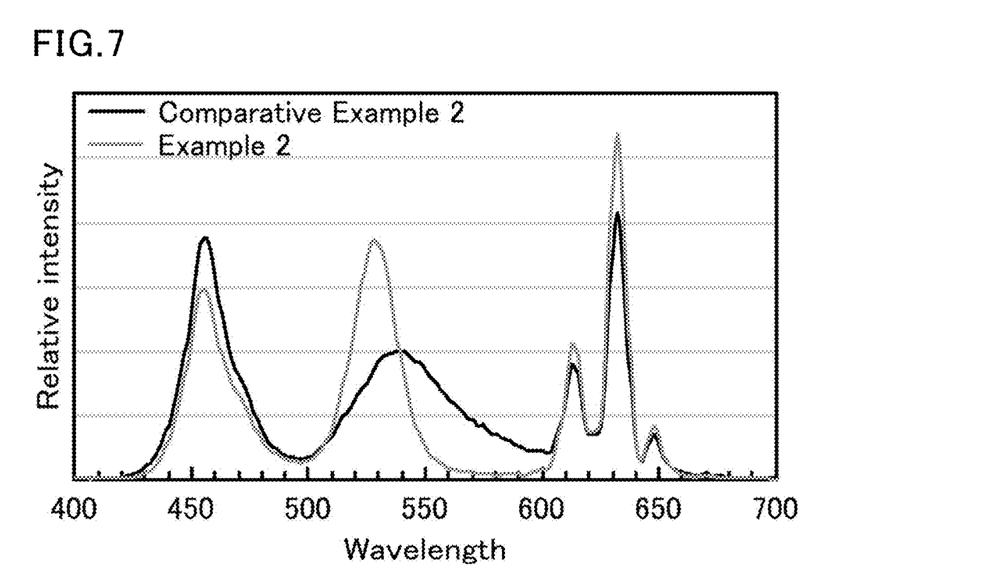
FIG. 7 is a graph showing the wavelength characteristics of light sources in liquid crystal display devices of Example 2 and Comparative Example 2.

FIG. 7 is a graph showing the wavelength characteristics of light sources in liquid crystal display devices of Example 2 and Comparative Example 2. A liquid crystal display device of Example 2 had a similar structure of the liquid crystal display device 1 of Embodiment 2. The liquid crystal display device of Example 2 was produced as in Example 1 excepting the light source and the wavelength characteristics of the color filter layer.

The green color filters used in Example 2 had a transmittance of 31% at a wavelength of 450 nm, a maximum transmittance of 96% in the wavelength band of 500 nm or longer and shorter than 600 nm, and a transmittance of 29% at a wavelength of 650 nm. The blue color filters had a maximum transmittance of 72% in the wavelength band of 400 nm or more and less than 500 nm. The light source used was a QD sheet that emitted green light having a peak wavelength of 528 nm and a half width of 24 nm. The light source had the wavelength characteristics of Example 2 shown in FIG. 7.

The backlight luminance was set to 10,000 cd/m². The liquid crystal panel included polarizing plates and a liquid crystal cell with alignment films. A target color gamut of the liquid crystal display device of Example 1 was in the CIE 1931 color space.

Comparative Example 2

The liquid crystal display device of Comparative Example 2 was produced as in Example 2 except that a light source having the wavelength characteristics of Comparative Example 2 shown in FIG. 7 was used and the blue color filters and the green color filters were changed.

The green color filters used in Comparative Example 2 had a transmittance of 3.6% at a wavelength of 450 nm, a maximum transmittance of 91% in the wavelength band of 500 nm or longer and shorter than 600 nm, and a transmittance of 2.7% at a wavelength of 650 nm. The blue color filters had a maximum transmittance of 78% in the wavelength band of 400 nm or more and less than 500 nm. The light source used was β-SiAlON phosphor that emitted green light having a peak wavelength of 540 nm and a half width of 54 nm.

(Evaluation of Example 2 and Comparative Example 2)

In the liquid crystal display device of Example 2, the green light had a narrower half width and a shorter wavelength, and the green color filters had high transmittance. This caused blue light leakage in the green pixels. The blue light leakage allowed the intensity of the blue light emitted from the light source of Example 2 to be low when the white point of the liquid crystal display device of Example 2 was matched to that of Comparative Example 2. Thus, as shown in Table 2, the intensity of the blue light in the liquid crystal display device of Example 2 was able to be reduced by 22% from that of Comparative Example 2. In the case of the CIE 1976 color space, the blue light leakage in the green pixels had a small impact on the color gamut. Thus, use of green light having a narrow half width maintained the color gamut even when the green color filters had high transmittance.

This prevented deterioration of the VHR of the liquid crystal composition. Accordingly, as liquid crystal compositions, the first liquid crystal compound and the second liquid crystal compound, each of which had a VHR easily decreased when exposed to blue light but achieved high speed response and high Δn, were able to be introduced in the liquid crystal composition.

Figure 8:
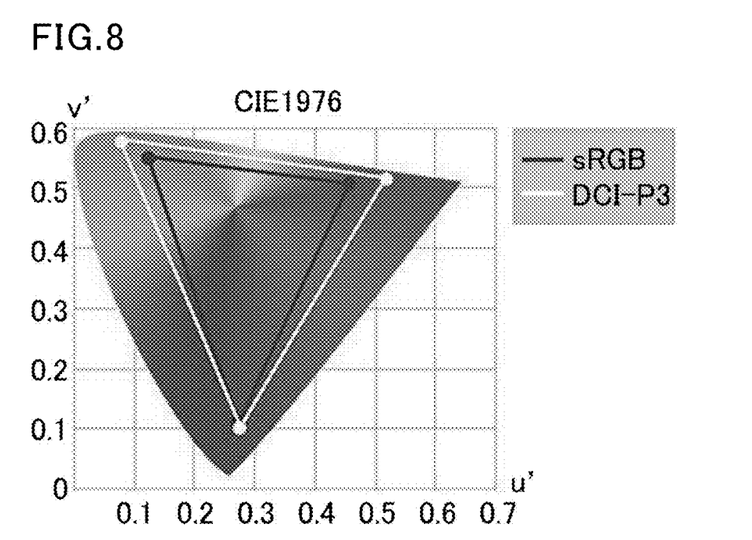
FIG. 8 illustrates how to determine the DCI-P3 coverage.

FIG. 8 illustrates how to determine the DCI-P3 coverage. The "DCI-P3 coverage (u'v') (%)" in the table below was determined as follows. In the CIE 1976 color system, DCI-P3 is represented by the white line triangle in FIG. 8.

The colors of the liquid crystal display device were measured, and RGB points (three points) were plotted in the coordinates shown in FIG. 8. The overlapping area of the black line triangle made by the three points and the white line triangle of DCI-P3 was calculated (this area was defined as A). Further, the area of the white line triangle of the DCI-P3 was defined as B. The area A was divided by the area B to obtain the DCI-P3 coverage (u'v') (%).

TABLE 2

| | Half-value width of green light | White point | DCI-P3 coverage (u' v') (%) | Percentage of reduction in intensity of blue light (%) |
|---|---|---|---|---|
| Comparative Example 2 | 54 nm | D65 | 80% | — |
| Example 2 | 24 nm | D65 | 80% | 22% |

Figure 9:
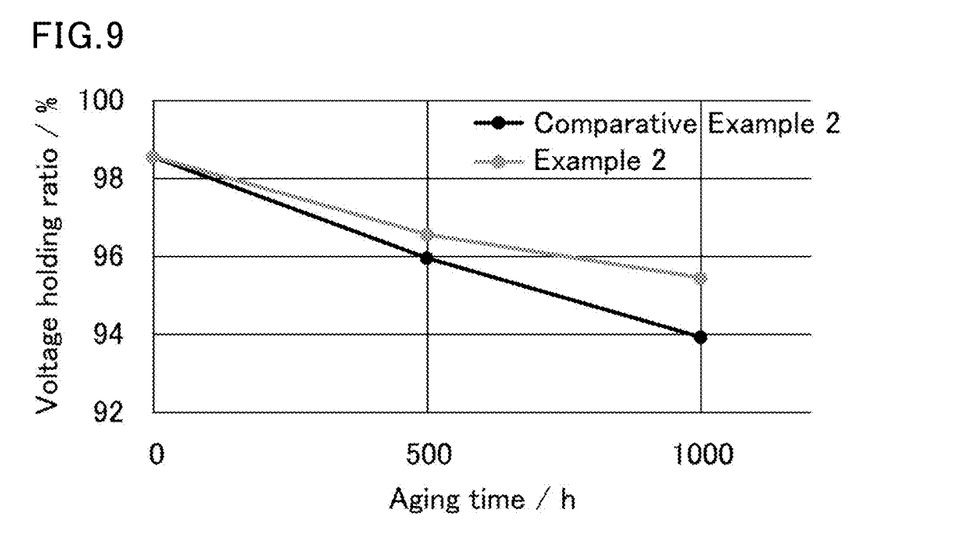
FIG. 9 is a graph showing the VHRs of the liquid crystal display devices of Example 2 and Comparative Example 2.

FIG. 9 is a graph showing the VHRs of the liquid crystal display devices of Example 2 and Comparative Example 2. The VHRs of the liquid crystal display devices of Example 2 and Comparative Example 2 were measured as in Example 1. The results are shown in FIG. 9.

As shown in FIG. 9, the VHR of the liquid crystal display device of Example 2 after 1000-hour aging was improved by 1.5% compared to that of the liquid crystal display device of Comparative Example 2. In Example 2, the VHR of the liquid crystal display device after 1000 hour-aging was improved by 1.5% compared to that of the liquid crystal display device of Comparative Example 2 by using a light source that emitted green light having a half width of 24 nm, even when the liquid crystal display devices of Example 2 and Comparative Example 2 had the same NTSC area ratio.

Example 3

A liquid crystal display device of Example 3 was produced as in Example 2 except that a QD sheet that emitted green light having a peak wavelength of 528 nm and a half width of 30 nm was used. The film thickness of the color filter layer of Example 3 was adjusted so that the color gamut of Example 3 was the same as that of Example 2 and the percentage of reduction in the intensity of blue light was as high as possible.

Example 4

A liquid crystal display device of Example 4 was produced as in Example 2 except that a QD sheet that emitted green light having a peak wavelength of 528 nm and a half width of 40 nm was used. The film thickness of the color filter layer of Example 4 was adjusted so that the color gamut of Example 4 was the same as that of Example 2 and the percentage of reduction in the intensity of blue light was as high as possible.

Comparative Example 3

A liquid crystal display device of Comparative Example 3 was produced as in Example 2 except that a QD sheet that emitted green light having a peak wavelength of 528 nm and a half width of 51 nm was used.

(Evaluation of Examples 2 to 4 and Comparative Examples 2 and 3)

Table 3 below confirms that use of a light source that emitted green light having a half width of 40 nm or less can achieve a higher percentage of reduction in the intensity of blue light.

TABLE 3

| | Half-value width of green light | White point | DCI-P3 coverage (u' v') (%) | Percentage of reduction in intensity of blue light (%) |
|---|---|---|---|---|
| Comparative Example 2 | 54 nm | D65 | 80.4% | — |
| Example 2 | 24 nm | D65 | 80.2% | 22% |
| Example 3 | 30 nm | D65 | 80.4% | 20% |
| Example 4 | 40 nm | D65 | 80.3% | 17% |
| Comparative Example 3 | 51 nm | D65 | 80.4% | 15% |

REFERENCE SIGNS LIST

1: liquid crystal display device
10: liquid crystal panel
20: backlight
21: light source
21B: blue light source
21GQD: green quantum dot
21Q: QD sheet (quantum dot sheet)
21RQD: red quantum dot
22: light guide plate
23: reflector
100: first substrate
110, 210: supporting substrate
120: thin-film transistor (TFT)
130: pixel electrode
200: second substrate
220: color filter layer
220B: blue color filter
220G: green color filter
220R: red color filter
230: common electrode
300: liquid crystal layer
410: first polarizing plate
420: second polarizing plate
LB: blue light
LG: green light
LR: red light

What is claimed is:

1. A liquid crystal display device, comprising:
a liquid crystal panel that includes a liquid crystal layer containing a liquid crystal composition; and
a light source that emits light on the liquid crystal panel, wherein
the liquid crystal composition contains a first liquid crystal compound containing a phenyl group and a conjugated bond group that forms a continuous conjugated system with the phenyl group and a second liquid crystal compound containing an alkenyl group not forming a conjugated system, and contains the second liquid crystal compound in an amount of 51% by weight or more,
the light source emits green light having a half width of less than 50 nm,
the first liquid crystal compound contains at least one of partial structures represented by the following formulas (L1) to (L5):

in (L1) to (L5), $X^{11}$ to $X^{16}$, $X^{21}$ to $X^{24}$, $X^{31}$ to $X^{34}$, $X^{41}$ to $X^{44}$, and $X^{51}$ to $X^{53}$ each independently represent a hydrogen group or a halogen group; and * represents a binding site, the second liquid crystal compound containing at least one of partial structures represented by the following formulas (L6) and L7):

in the formulas (L6) and (L7), $R^1$ represents a C1-C3 alkyl group; and * represents a binding site, and
the liquid crystal panel includes a blue color filter, the blue color filter having a maximum transmiittance of 85% or higher to 100% or lower in the wavelength band of 400 nm or more and less than 500 nm.

2. The liquid crystal display device according to claim 1, wherein the light source emits green light having a half width of 40 nm or less.

3. The liquid crystal display device according to claim 2, wherein the light source emits green light having a half width of 25 nm or less.

4. The liquid crystal display device according to claim 1, wherein the light source includes a blue light source that emits blue light and green quantum dots that emit green light.

5. The liquid crystal display device according to claim 1, wherein the liquid crystal composition contains the first liquid crystal compound in an amount of 2% by weight or more.

6. The liquid crystal display device according to claim 5, wherein the liquid crystal composition contains the first liquid crystal compound in an amount of 20% by weight or more.

7. The liquid crystal display device according to claim 1, wherein the liquid crystal composition contains the second liquid crystal compound in an amount of 70% by weight or more.

8. The liquid crystal display device according to claim 1, wherein the liquid crystal panel includes a green color filter, the green color filter having a transmittance of 5% or higher at a wavelength of 450 nm.

9. The liquid crystal display device according to claim 1, wherein the light source further emits blue light having a peak wavelength of 453 nm or longer and shorter than 480 nm.

* * * * *